United States Patent
Sugiyama et al.

(10) Patent No.: US 7,907,203 B2
(45) Date of Patent: Mar. 15, 2011

(54) IMAGING APPARATUS

(75) Inventors: Katsuhiro Sugiyama, Chiba (JP); Mayumi Kamiya, Tokyo (JP); Masaki Mikamo, Kanagawa (JP); Yoshihiko Nishimura, Tokyo (JP); Keiki Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 10/554,370

(22) PCT Filed: May 19, 2004

(86) PCT No.: PCT/JP2004/007148
§ 371 (c)(1),
(2), (4) Date: Oct. 25, 2005

(87) PCT Pub. No.: WO2004/102955
PCT Pub. Date: Nov. 25, 2004

(65) Prior Publication Data
US 2006/0274179 A1    Dec. 7, 2006

(30) Foreign Application Priority Data
May 19, 2003  (JP) .................. 2003-141003

(51) Int. Cl.
*H04N 5/222* (2006.01)
(52) U.S. Cl. ............. 348/333.02; 348/207.1; 348/207.2; 348/372; 348/375
(58) Field of Classification Search ...... 348/207.99–376
See application file for complete search history.

(56) References Cited

U.S. PATENT DOCUMENTS

| | | | |
|---|---|---|---|
| 5,198,851 A | | 3/1993 | Ogawa |
| 5,915,133 A * | | 6/1999 | Hirai et al. ............... 396/48 |
| 5,949,484 A | | 9/1999 | Nakaya et al. |
| 5,963,255 A | | 10/1999 | Anderson et al. |
| 6,195,513 B1 | | 2/2001 | Nihei et al. |
| 6,851,066 B2 * | | 2/2005 | Obitsu ................. 713/323 |
| 7,518,653 B2 * | | 4/2009 | Ishimaru ................ 348/372 |
| 2005/0013605 A1 * | | 1/2005 | Kubo ..................... 396/374 |

FOREIGN PATENT DOCUMENTS

EP     0 794 438 A2    9/1997
(Continued)

OTHER PUBLICATIONS

Austrian Search Report and Written Opinion for Singapore Patent Application No. 200506559-4 dated Jan. 10, 2008.

(Continued)

*Primary Examiner* — Sinh Tran
*Assistant Examiner* — Anthony J Daniels
(74) *Attorney, Agent, or Firm* — Rader, Fishman & Grauer PLLC

(57) ABSTRACT

An imaging apparatus having an imaging means for imaging an object is provided, when connected to an external device, the apparatus is capable of setting on a screen a function corresponding to the external device, and also capable of displaying a character or outputting sound, corresponding to an automatic power-off function or the switched over operation mode.

An imaging apparatus includes imaging means for imaging an object, recording and playback means for recording and playing back image data imaged by the imaging means, and connection means for connecting an external device having a connection format which conforms to a predetermined standard, wherein the connection means selects or sets a format of the connection to the external device by changing-over of a switch

18 Claims, 7 Drawing Sheets

FOREIGN PATENT DOCUMENTS

| | | |
|---|---|---|
| EP | 0 862 313 A2 | 9/1998 |
| JP | 09-116971 A * | 2/1997 |
| JP | 09-116791 | 5/1997 |
| JP | 10-173970 | 6/1998 |
| JP | 10-229541 | 8/1998 |
| JP | 2000-066774 | 3/2000 |
| JP | 2000-253303 | 9/2000 |
| JP | 2002-305677 | 10/2002 |
| JP | 2002-305677 A * | 10/2002 |
| JP | 2003-069863 | 3/2003 |

OTHER PUBLICATIONS

Japanese Office Action; Application No. 2003-141003; Dated: Feb. 26, 2007.
International Search Report mailed Sep. 14, 2004.
International Search Opinion mailed Sep. 14, 2004.
Supplemental European Search Report issued Aug. 21, 2009 for corresponding European Application No. 04 73 3965.

* cited by examiner

IMAGING APPARATUS

TECHNICAL FIELD

The preset invention relates to an imaging apparatus, and more specifically to an imaging apparatus which is able to produce various functions when connected to a device, for example, a printer in conformity to a predetermined standard, for example, a USB (Universal Serial Bus) by making a selection of connection modes by a power switch or a recording/playback mode selection switch, by providing an automatic power-off function, or by providing means to notify as the operation mode is switched in the power-on condition.

BACKGROUND ART (1) Although a conventional imaging apparatus, for example, a video camera with still image recording playback functions is to be connected to a personal computer (referred to as a PC below) as a USB device, some of such apparatus are able to be directly connected to printers with a USB cable, in recent years, and a function capable of directly printing still images (referred to as a PictBridge function below) is installed. One example was disclosed in Japanese Patent Application Publication No. 2000-66774, at page 3 and FIG. 1.

(2) Besides, in a video camera, under an imaging standby condition, a video tape is normally in contact with a rotary magnetic head and the rotary magnetic head unit is kept operating continuously so that image recording can be started immediately upon receiving instructions to start imaging by the user. However, repeated abrasion of the same position on the video tape by the head may damage the video tape and the rotary magnetic head unit. In order to avoid such damages, it was customary to automatically turn off the power and stop the rotation of the magnetic head when the imaging standby condition continued for a predetermined time.

(3) Moreover, in case when there is a plurality of operation modes, it is known to visually indicate each of the operation modes by lighting or blinking an LED corresponding thereto.

However, in the prior art imaging apparatus as described in the above (1), if an imaging apparatus is provided with the PictBridge function, depending on the case when the imaging apparatus is connected to a conventional PC or when it is connected to a printer, it is necessary to make a selection thereof and there is a problem that the selection is relatively complicated.

Accordingly, in an imaging apparatus such as, for example, a video camera or the like provided with the PictBridge function, there is a problem to be solved by adding a function which makes the selection of connection to a PC or a printer to be simple.

Also, in the prior art imaging apparatus as described the above (2) in which the power is automatically shut off and the rotation of the rotary magnetic head is stopped when the imaging standby condition continues for a time longer than the predetermined time, since its primary object is to prevent damage of the head and the tape, in case when no video tape is loaded, at the standby period in the imaging mode of still images or moving images on a memory card, or at the standby period in the playback mode of a video tape or a memory card, there is a problem that the automatic power-off does not operate and the power (a battery power supply, an AC power) is unnecessarily wasted. As a result, if the user leaves the video camera in the playback standby mode by mistake, the battery will be depleted after lapse of a certain time, thereby making the imaging impossible when one wants to and losing an imaging opportunity.

On the other hand, in an imaging mode for imaging on a tape, the abovementioned power-off takes place in order to prevent damage as described hereinabove. However, since power-off takes place after lapse of a predetermined time even if the user is operating other than start of recording images in the imaging standby condition such as, for example, a character input operation for captioning on a touch panel, such power interruption while the user is in operation prevents him/her from continuing such operation and thus aggravates the operability.

Accordingly, it is intended to turn on/off the automatic power-off function during a plurality of or all modes of operation menu and also to disable the power-off under particular conditions even if the automatic power-off is set. These particular conditions include the case when the user is operating something such as depressing a certain key of the video camera, touching the touch panel or any other operation. In case of operating such key or the like, there is a problem to be solved by extending the time before the automatic power-off takes place.

Furthermore, in the prior art imaging apparatus as described in the above conventional apparatus (3), if it is constructed to light or blink an FED when the operation mode is changed, there is a problem that an exclusive LED is needed for each operation mode in order to notify it, thereby increasing the cost accordingly.

Therefore, there is a problem to solve the cost increase by sharing a display of the changed operation mode with something like display means for, for example, menu operation.

DISCLOSURE OF THE INVENTION

In order to overcome the above problems, the imaging apparatus according to the present invention is constructed as follows.

(1) An imaging apparatus comprises imaging means for imaging an object, recording and playback means for recording and playing back the image data imaged by the imaging means, still image recording and playback means for recording and playing back still image data imaged by the imaging means, display means for displaying on a screen image data imaged by the imaging means and having a function as a touch panel, and connection means for connecting an external device having a connection format which conforms to a predetermined standard, wherein the connection means selects or sets the connection format with the ex device by changing-over of a switch.

(2) In the imaging apparatus (1) of the present invention, the above mentioned switch is a power switch and a mode selection switch for changing the operation modes.

(3) Further in the imaging apparatus (1) of the present invention, the above mentioned external device includes a printer conforming to the USB standard and the connection thereof is made by a USB cable.

(4) Still further in the imaging apparatus of the present invention (1), the above mentioned connection means is such a type to display the connection format for guiding appropriate operations by displaying on a screen of the display means when connected to the external device.

(5) An imaging apparatus having another aspect of the present invention comprises imaging means for imaging an objects, video recording means for recording a video signal imaged by the imaging means, display means for displaying on a screen image data imaged by the imaging means and also having a function as a touch panel, and power supply means having a power switch for supplying the power to the apparatus, wherein the power supply means is provided with an automatic power-off function capable of automatically shutting off the power after lapse of a predetermined time while the apparatus is left untouched.

(6) In this imaging apparatus (5), the above mentioned automatic power-off function enables the user to select ON/OFF of the automatic power-off function in accordance with the operation menu which is displayed on the screen of the display means, and moreover, when the automatic power-off is selected by the operation menu, it is so controlled as to disable the power-off under a particular condition.

(7) Further in this imaging apparatus (6), the above mentioned particular condition includes that it is being connected with another electronic device by means of a cable or wireless.

(8) Sill further, this imaging apparatus (7) further comprises automatic extension means for automatically extending the time before the automatic power-off takes place if the user operates any key switch or the touch panel in addition to the particular condition.

(9) In the imaging apparatus (8), the above mentioned automatic extension means functions also effectively by operation of any key other than touch keys which are effective for operating the touch panel.

(10) An image pickup apparatus having still another aspect of the present invention comprises imaging means for imaging an object, video recording means for recording a video signal imaged by the imaging means, display means for displaying on the display screen the video data and also having a function as the touch panel, and mode switching means having a plurality of operation modes when the power is in the ON condition for enabling to change the plurality of operation modes, wherein the mode switching means includes operation mode notice means for displaying on the display screen of the display means characters indicating the changed operation mode.

(11) In this imaging apparatus (10), the above mentioned operation modes include a tape imaging mode for recording the data imaged by the imaging means on a tape and a memory imaging mode for writing the data imaged by the imaging means in a memory.

(12) Further, in this imaging apparatus (10), the above mentioned operation mode notice means displays the characters on the screen of the display means only for a predetermined tine after changing the operation mode.

(13) Still further, in this imaging apparatus (10), the above mentioned operation mode notice means displays characters on the screen of the display means and also provides an audible notice when the operation mode is changed.

(14) Also in this imaging apparatus (13), the above mentioned audible notice is a different sound depending on the changed operation mode.

(15) An imaging apparatus having still another aspect of the present invention comprises imaging means for imaging an object, video recording means for recording a video signal imaged by the imaging means, display means for displaying on the screen the video data imaged by the imaging means and having a function as a touch panel and mode switching means capable of changing a plurality of operation modes, wherein the mode switching means is provided with audible notice means which outputs a beep or a melody representing the changed operation mode.

(16) In the imaging apparatus (15), the above mentioned operation modes include a tape imaging mode for recording the data imaged by the imaging means on a tape and a memory imaging mode for writing the data imaged by the imaging means in a memory.

(17) Further, in the imaging apparatus (15), the above mentioned audible notice means outputs a beep or a melody for a predetermined time after changing the operation mode.

(18) Still further, in the imaging apparatus (15), the above mentioned audible notice means provides a different beep or melody depending on the changed operation mode.

BEST MODES FOR CARRYING OUT THE INVENTION

Now, various embodiments of the imaging apparatus according to the present invention will be described hereunder by reference to the drawings.

Figure 1:
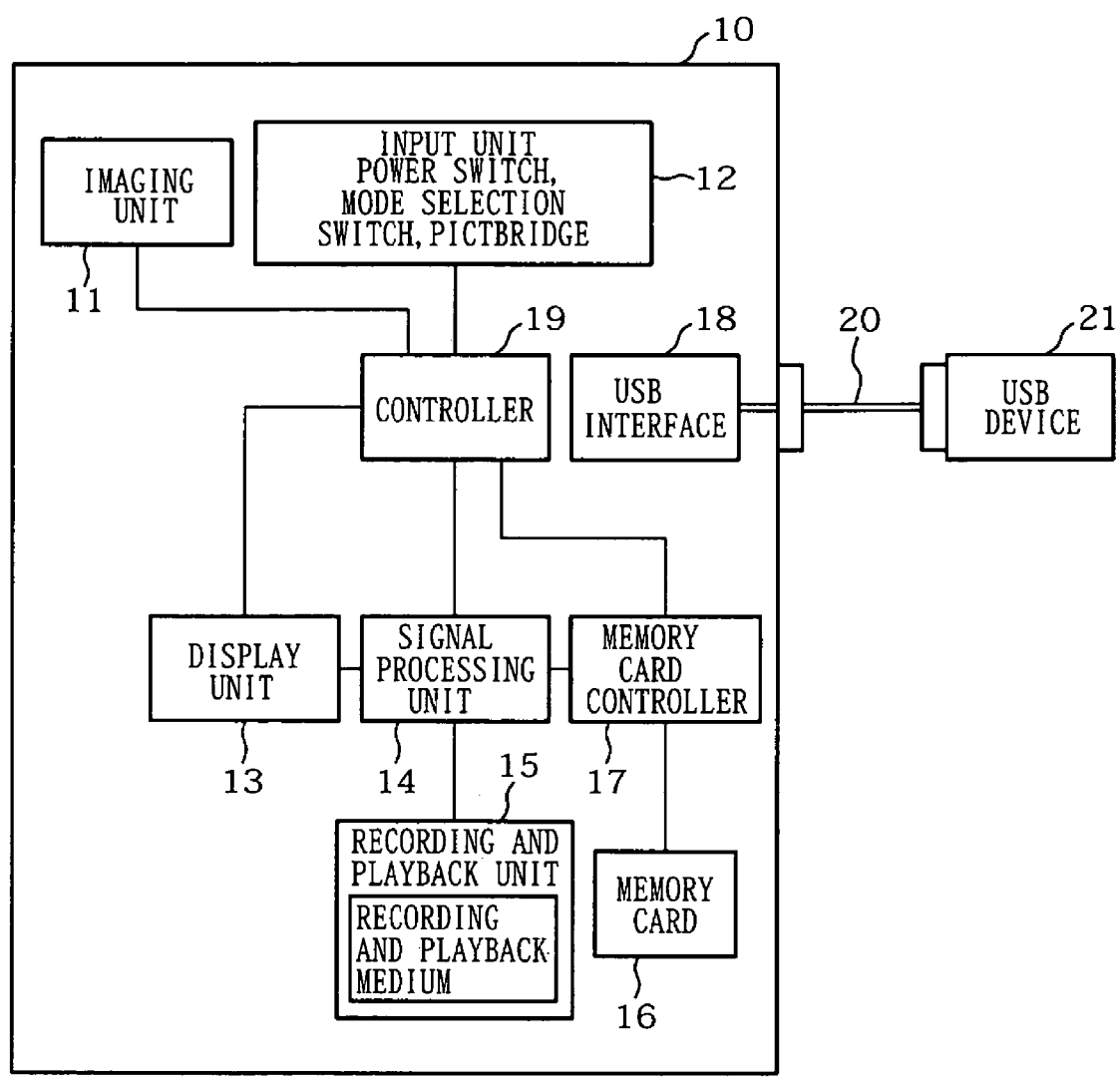
FIG. 1 is a block diagram to show the construction of the imaging apparatus according to the present invention.

A first embodiment of the imaging apparatus according to the present invention is constructed, as shown in FIG. 1, to be connected to an external USB device such as, for example, a printer (printing device), a PC, and comprises an imaging unit 11 for imaging an object, an input unit 12 comprising a power switch, a mode selection switch for changing operation modes, a PictBridge switch for performing the PictBridge function, other buttons and the like, a display unit 13 comprising a screen provided with a touch panel operation function, a signal processing unit 14 for processing video data or the like imaged by the imaging unit 11, a recording and playback unit 15 for recording the video signal imaged on a recording and playback media such as a tape or the like, a memory card 16 which is a removable recording and playback medium for storing still image data, a memory card controller 17 for controlling the memory card 16, a USB interface 18 for controlling data transmission and reception with the USB device 21 which is an external device by way of a USB cable 20, and a controller 19 for controlling the imaging unit 11, the recording and playback unit 15, the input unit 12, the display unit 13, the signal processing unit 14, the memory card controller 17, and the USB interface 18.

In the imaging apparatus of the construction as described hereinabove, depending on the kinds of the external USB device 21 which is connected to the imaging apparatus 10 by way of the USB cable 20, the controller 19 controls the USB interface 18 so that any still image data previously stored in the memory card 16 can be transferred, or the controller 19 controls the USB interface 18 so that the data from the signal processing unit 14 can be transferred.

Any change of the control can be made by the switch of the input unit 12. In the embodiment, the user is able to set to the tape imaging mode, the memory imaging mode or the playback mode as the change of the control by the power switch or the mode selection switch for selecting the operation modes.

Figure 2:
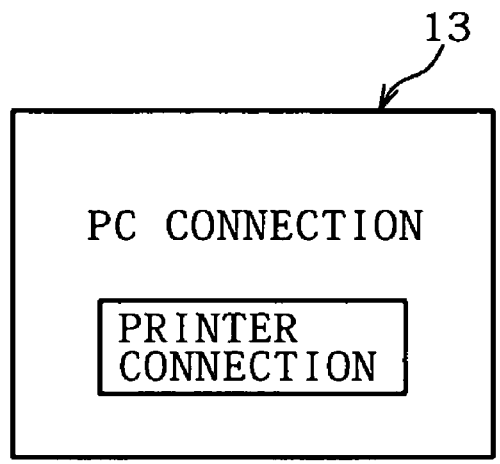
FIG. 2 is a diagram to show the status of a USB device as displayed on a screen of the display unit of the imaging apparatus according to the present invention.

Such setting can be recognized on the display unit 13 and if the "PRINTER CONNECTION" is in reversing display as shown in FIG. 2, the printer is connected and it suggests that the function for driving the printer is installed. In addition to the above, it is possible to display to the user such information as device conditions and the like.

For example, it is assumed that a printer is connected as the external USB device 21 under the condition that the data from the signal processing unit 14 is transferred to the external USB device 21 and the controller 19 is set to control the USB interface 18. Under the above condition, in case of performing the function to transfer the still image data in the memory card 16 to the printer for printing (PictBridge function), the user can depress the enter button for the PictBridge function (PictBridge switch) in the input unit 12. Then, the PictBridge function is performed and the still image data stored in the memory card 16 is printed by the printer.

Incidentally, since it is necessary to change the settings of the control of the controller 19 to enable the transfer of the still image data in the memory card 16, the display unit 13 displays for prompting the user to change the settings into the selectable condition. Subsequently, the setting is made in the input unit 12 to set the control to enable the transfer of the still image data in the memory card 16.

Under this condition, if the external USB device 21 is connected with the USB cable 20 to enable the transfer, the PictBridge function is carried out. If the USB cable 20 is not connected, it is possible that the user is prompted on the display unit 13 to connect the cable by displaying that the USB cable 20 or the like is not connected.

On another occasion, in case when the mode is to be changed in the input unit 12 and there are, for example, the tape imaging mode, the memory imaging mode and the playback mode in which communication can be performed with the USB device 21, it is also possible to change the selection of the USB device 21 to be only for communication for signal processing by this mode.

As described hereinabove, despite of complicated settings of items depending on the kinds of USB device 21 to be connected, the imaging apparatus 10 enables the user to easily execute applications, by memorizing setting values in the respective modes on the basis of replacement of setting items and contents depending on the mode conditions of the imaging apparatus 10 due to switching of the mode selection switches and the like, or by providing the selecting method of the appropriate communication system and by displaying suitably the conditions depending on whether or not the USB cable 20 is connected or a removable memory card 16 is inserted in case of executing applications by the USB communication from the imaging apparatus.

Now, a second embodiment of the imaging apparatus according to the present invention will be described by reference to the drawings.

The second embodiment of the imaging apparatus is provided with the automatic power-off function which automatically shut off the power under pi conditions even in any mode other than the imaging mode and has the same hardware construction on as the first embodiment of the imaging apparatus as shown in FIG. 1.

Figure 3:
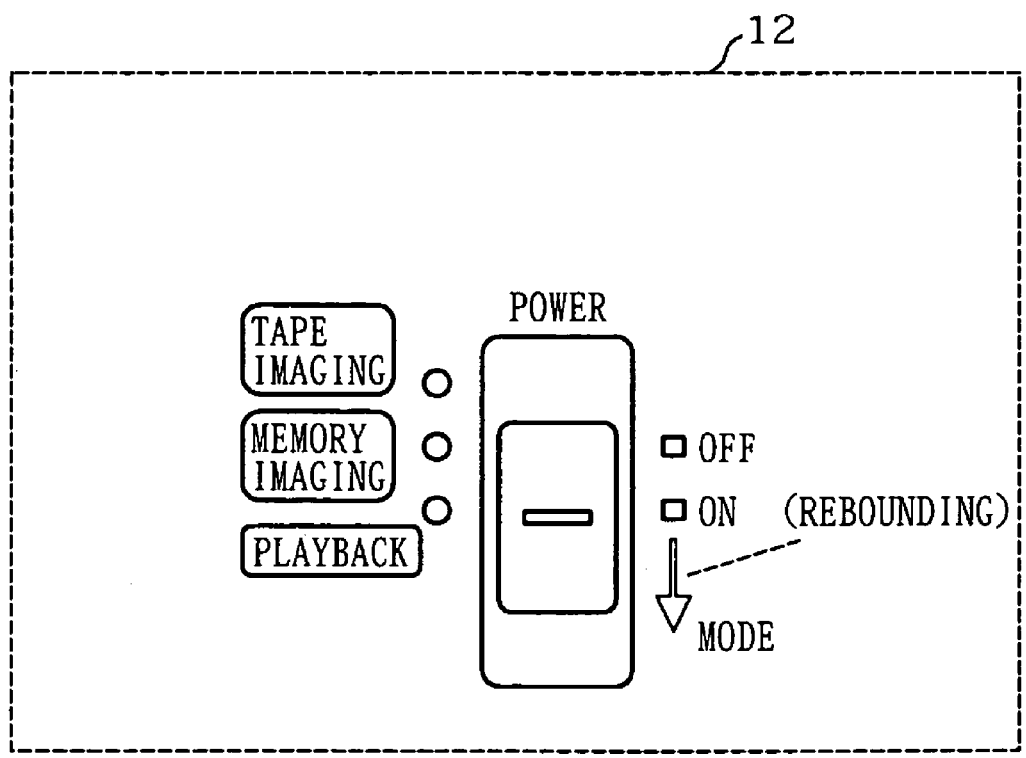
FIG. 3 is a diagram of the switches of the power supply portion of the imaging apparatus according to the present invention.

Here, the power mode selection switch in the input unit 12 is, as shown in FIG. 3, a switch capable of selecting the modes in addition to power on/off, wherein the power is turned off in the "OFF" position of the power and the power is supplied to the apparatus in the "ON" position of the power. It is constructed that the mode can be changed by sliding the button further down from the "ON" position. By releasing the button after sliding it toward the MODE, it is designed to rebound (return) to the "ON" position.

When the button is set to the "ON" position in order to turn on the power and then it is slid to the MODE, the "tape imaging mode" is selected and the uppermost lamp is lit. When further the returned button is slid to the MODE, the "memory imaging mode" is selected and the second lamp from the top is lit and when further the returned button is slid to the MODE, the "playback mode" is selected and the bottom lamp is lit.

By sliding the button of the power switch in the direction of MODE in the above manner, the tape imaging mode, the memory imaging mode and the playback mode can be selected sequentially.

Figure 4:
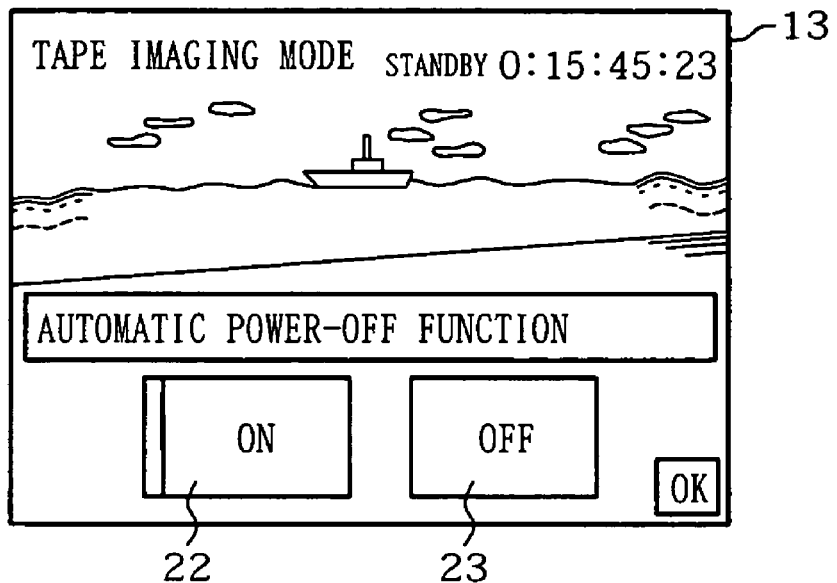
FIG. 4 is a diagram of the superimposed display of the automatic power-off function on the screen of the display unit of the imaging apparatus according to the present invention.
Figure 5:
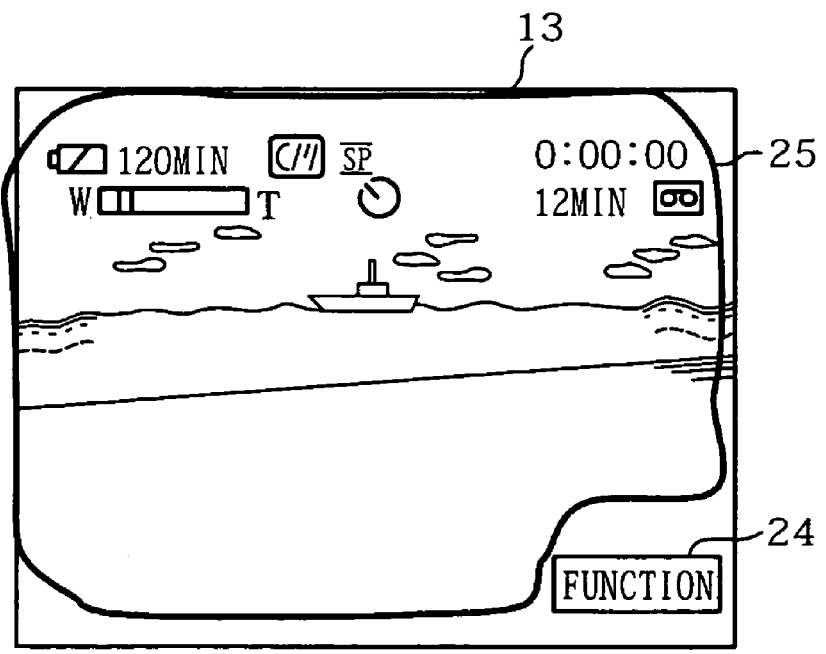
FIG. 5 is a diagram of the button zone and the other zone the screen of the display unit of the imaging apparatus according to the present invention.

Now that the power is supplied by setting the power switch button to the "ON" position, then the controller 19 controls to display a menu display on the screen of the display unit 13. As shown in FIG. 4, an "ON" button 22 and an "OFF" button 23 for the automatic power-off function are displayed in the menu display for operation by the user. By depressing the "ON" button 22 between the "ON" button 22 and the "OFF" button 23 by the user, the automatic power-off function can be enabled. If the "OFF" button 23 is depressed, the automatic power-off function is disabled and thus the power-off does not take place.

Figure 6:
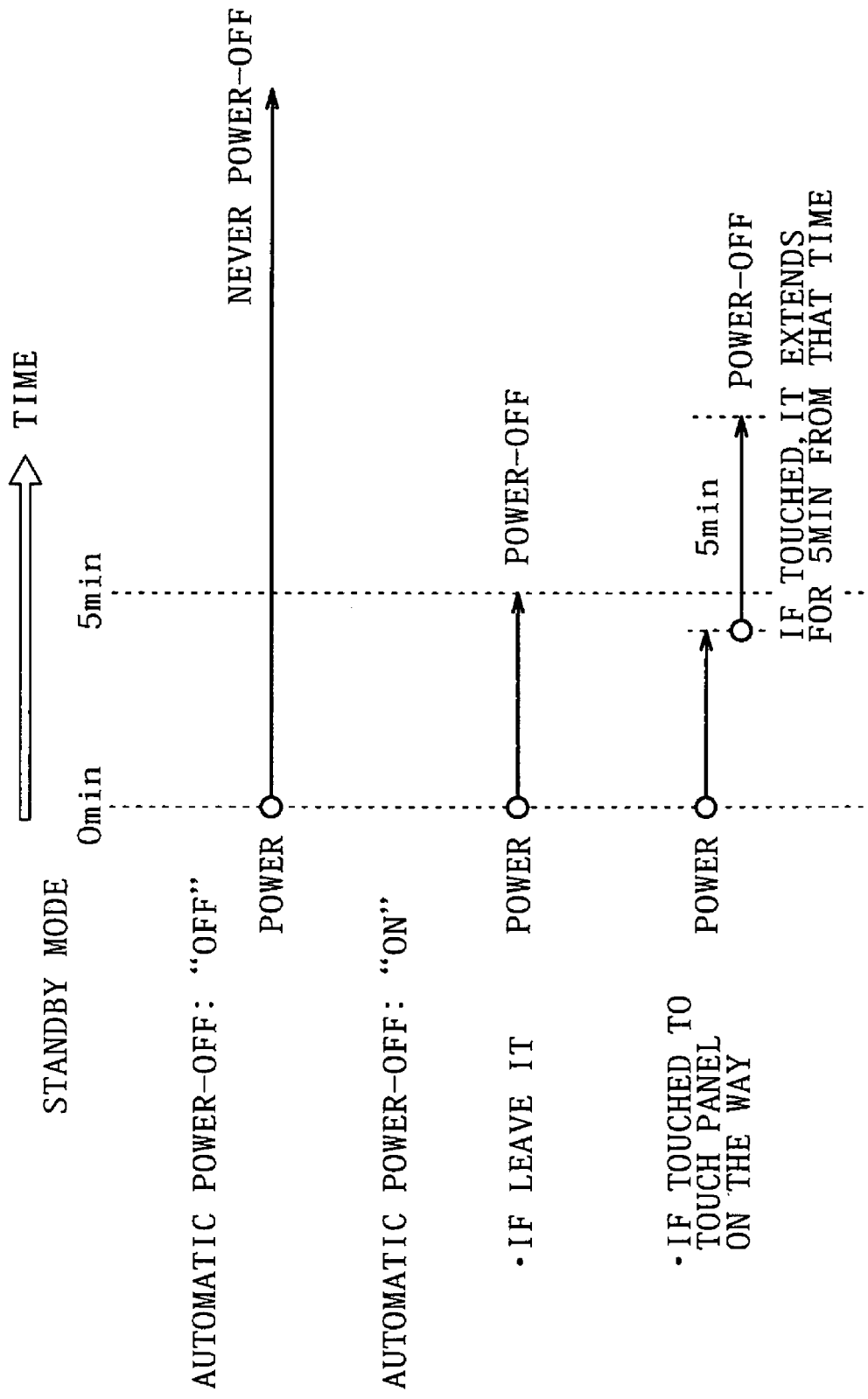
FIG. 6 is a diagram of the operation of the automatic power-off function of-the imaging apparatus according to the present invention.

As shown in FIG. 6, when the automatic power-off function is enabled, the power is turned off at the lapse of a predetermined time, 5 minutes in the embodiment if the user does not manipulate and leave it.

After the automatic power-off function is enabled, if the user may touch the touch panel in the display unit 13 on the way of the automatic power-off function, the time is extended from the instance when it is touched and the power-off takes place after lapse of the predetimined time, 5 minutes in this embodiment, from that instance.

As for the user's operation of the touch panel, it is not limited only to the touch panel zone 24 but also may be touched to the display screen at a display zone 25 for displaying. In this case, it is possible to detect every touching zone of the touch panel not only by using commands due to depressing effective GUI keys but also by detecting any change in analog value from the touch panel device or coordinate value after analog-digital conversion, thereby extending the time before the automatic power-off takes place.

Figure 7:
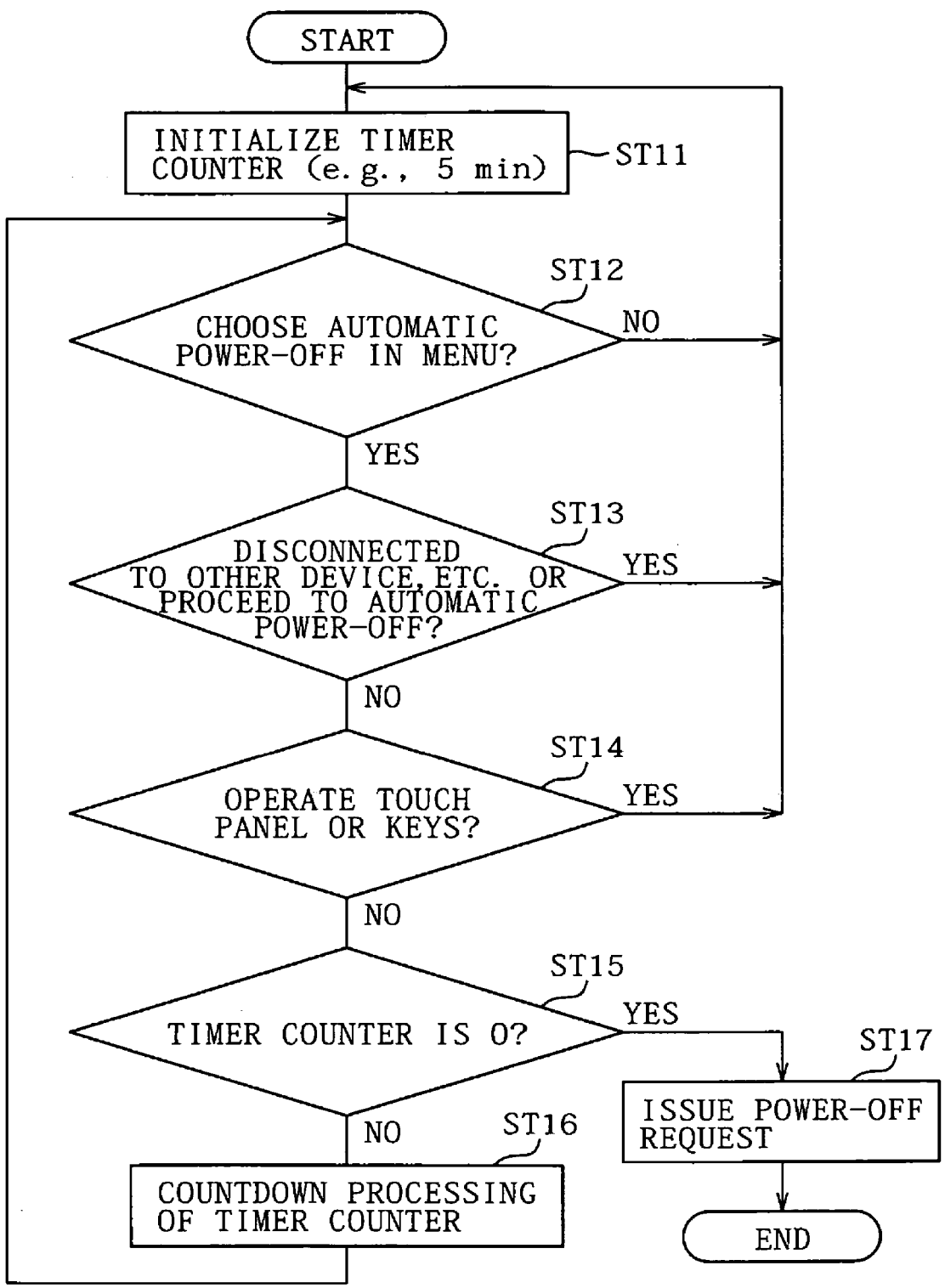
FIG. 7 is a flowchart for the operation of the automatic power-off function of the imaging apparatus according to the present invention.

The operation of such automatic power-off function will be described hereunder by reference to the flow chart as shown in FIG. 7.

Firstly, a timer counter is initialized to count 5 minutes in this embodiment in step ST 11.

When the automatic power-off function is selected in the menu, judgment is made if the automatic power-off can be continued without any condition of being connected to another device, being in the imaging operation, or being under character input on the screen of the display unit 13, in steps ST 12 and ST 13.

If it is permitted to continue the automatic power-off, it is then detected if the touch panel keys, switches or the like are not operated in step ST 14.

If the touch panel or the like is not operated, then it is checked if the timer count is not zero in step ST 15.

If the counter is not zero, the timer counter is counted down before proceeding to the step ST 12 and it is checked if the touch panel or the like is not operated. (step ST 16)

If the count of the timer counter is zero in step ST 15, a power-off request is issued. Upon issuing the power-off request, the power supplied to the apparatus is shut off in step ST 17.

As described hereinabove, it is possible to suppress unnecessary power consumption by setting the automatic power-off to the "ON" condition in any mode by the user. This makes it possible to reduce losing imaging opportunities.

As the predetermined conditions, by disabling the power-off when the imaging apparatus is connected to any device, it is possible to avoid a trouble such as freezing the connected device when it is a personal computer or the like.

Moreover, by disabling the automatic power-off when characters are being entered on the touch panel, it is possible to achieve automatic power-off function better matched to the user's operation feeling.

Now, a third embodiment of the imaging apparatus according to the present invention will be described by reference to the drawings.

The third embodiment of the imaging apparatus is cons to display characters and notifies by sound at the mode changing time of the imaging apparatus having a plurality of modes such as operation modes, for example, the tape imaging mode, the memory imaging mode and the like at the power-on. Since the construction is the same as the one which is employed in the first embodiment as shown in FIG. 1, the description of the construction is omitted.

Settings of the power switch and the operation modes are the same as the power switch as described in the second embodiment of the imaging apparatus as shown in FIG. 3. That is, the power is turned on by setting the button of the power switch in the input unit 12 of the imaging apparatus 10 to the "ON" position and the operation mode can be switched to the tape imaging mode, the memory imaging mode or the playback mode by sliding it from that position.

Figure 8:
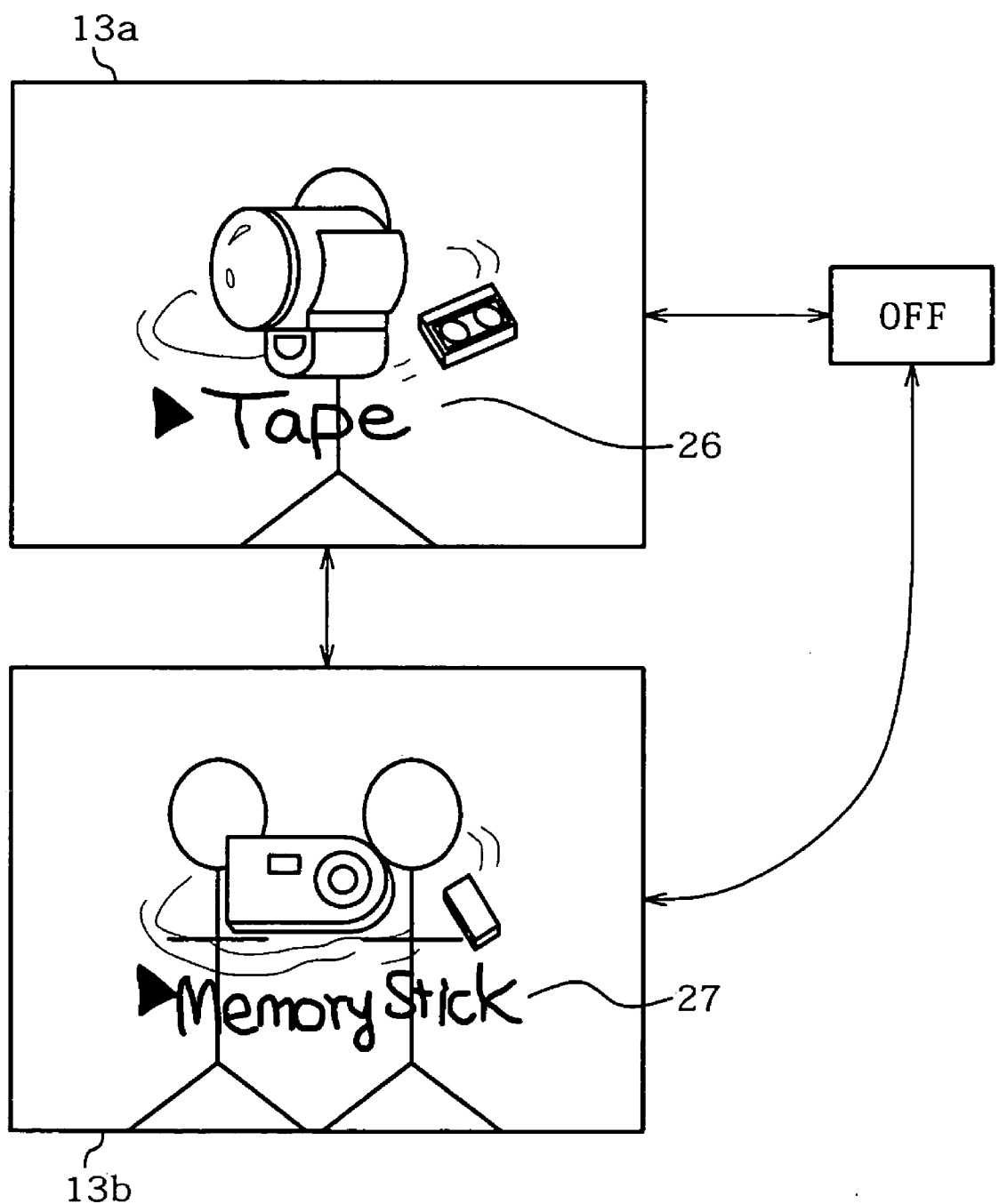
FIG. 8 is a diagram of the characters to be displayed when switched to particular operation modes of the imaging apparatus according to the present invention.

As shown in FIG. 8, assuming now that there are the "tape imaging mode" to use a video tape as a recording and playback medium and the "memory imaging mode" to use a memory card and that the operation mode is switched to the "video imaging mode", characters 26 comprising both of a video camera and a video tape as a recording and playback medium are displayed on the screen of the display unit 13a in a superimposed manner. Preferably, they are displayed in such a manner to move right and left in order to visualize that the switched operation mode is the "tape imaging mode".

And when the operation mode is switched to the "memory imaging mode" as shown as the display unit 13b in FIG. 8, characters 27 comprising a camera and a memory stick are displayed on the screen of the display unit 13b in a superimposed manner. Preferably, they are displayed in such a manner to move right and left in order to visualize that the changed operation mode is the "memory imaging mode".

The display of these characters 26, 27 are displayed for a given time, several seconds in the embodiment for notice of this mode, and disappear after lapse of the given time, thereby returning to the screen of the initial display.

Although the operation modes are restricted to the "tape imaging mode" and the "memory imaging mode", there is no reason to restrict to such modes and it is of course possible to apply the present invention to various operation modes. Additionally, it is of course possible to display on the screen special characters corresponding to these operation modes.

Now, distinction by sound will be described hereunder.

Figure 9:
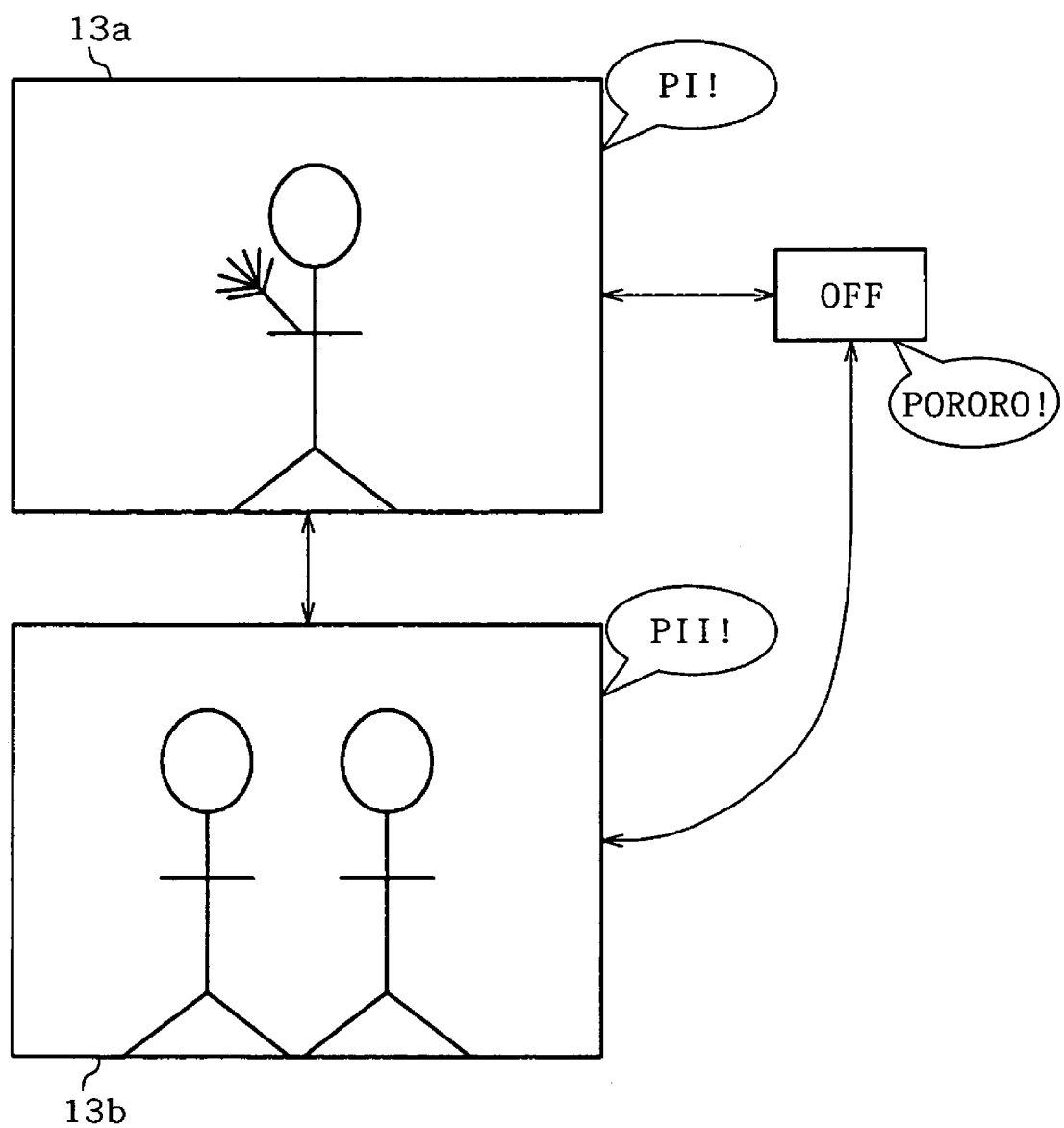
FIG. 9 is a diagram of outputting sounds when switched to a particular operation mode of the imaging apparatus according to the present invention.

As shown in FIG. 9, in a case when there are the "tape imaging mode" and the "memory operation mode" and the operation mode is switched to the "tape imaging mode" as shown by the display unit 13a in FIG. 9, a beep such as "Pi!" is outputted while outputting a beep such as "Pii!" when the operation mode is switched to the "memory imaging mode" as shown by the display unit 13b in FIG. 9.

And the output of such beep is terminated after lapse of a predetermined time from the time when it started.

Of course, the beep output is not limited to these examples and the kinds of the sounds are not restricted and may be, for example, melodies.

There are circumstances where the output of such beep is disabled depending on the conditions of the imaging apparatus.

It is possible to set not to output such beep in such a circumstance, for example, where the guide is turned off in the menu setting or where a catastrophic damage is accompanied to internal data by any sound or display under special conditions of the imaging apparatus such as, for example, outputting a sound while audio recording.

As appreciated from the foregoing, according to the invention, it is possible not only to improve operability by displaying characters on the screen or outputting a sound corresponding to the operation mode for assisting the user to recognize the operation mode by the display on the screen or the sound, but also to reduce cost by applying the existing display unit 13.

INDUSTRIAL APPLICABILITY

As described hereinabove, the imaging apparatus according to the present invention, when connected to a USB device, is capable of setting items corresponding to the USB device on the screen which is provided with a touch panel function, thereby enabling to easily carry out settings corresponding to the USB device.

Additionally, it is possible to set the automatic power-off function in all modes of the tape imaging mode, the memory imaging mode, etc., thereby eliminating unnecessary power consumption and reducing loss of imaging opportunities. Moreover, it is possible not only to improve operability by displaying characters on the screen or outputting a sound corresponding to the operation mode for assisting the user to recognize the operation mode by the display on the screen or the sound, but also to reduce cost by applying the existing display unit.

The invention claimed is:
1. An imaging apparatus comprising:
  imaging means for imaging an object;
  recording and playback means for recording and playing back image data imaged by said imaging means;
  still image recording and playback means for recording and playing back still image data imaged by said imaging means;
  display means for displaying on a screen image data imaged by said imaging means and having a function as a touch panel; and connection means for connecting an external device having a connection format which conforms to a predetermined standard;

wherein said connection means selects or sets the connection format with the external device by changing-over of a switch and wherein the switch moves between and among a power OFF position, a mode selection position and a power ON position disposed between the power OFF position and the mode selection position, the switch is stationary at the power OFF position and the power ON position and is resiliently biased towards the power ON position when the switch moves from the power ON position to the mode selection position such that, upon applying a sufficient force to the switch in the ON position and directed to the mode selection position, the switch moves from the ON position to the mode selection position and, upon removal of the sufficient force when the switch is at the mode selection position, the switch automatically returns to the ON position.

2. The imaging apparatus as cited in claim 1, wherein said switch is a combination of a power switch and a mode selection switch, the mode selection switch configured for changing operation modes of the imaging apparatus.

3. The imaging apparatus as cited in claim 1, wherein said external device includes a printer conforming to the USB standard and the connection thereof is made by a USB cable.

4. The imaging apparatus as cited in claim 1, wherein said connection means is such a type to display the connection format for guiding appropriate operations by displaying on a screen of said display means when connected to the external device.

5. An imaging apparatus comprising:
imaging means for imaging an object;
video recording means for recording a video signal imaged by said imaging means;
display means for displaying on a screen image data imaged by said imaging means and having a function as a touch panel; and
power supply means having a switch for supplying the power to the imaging apparatus;
wherein the power supply means is provided with an automatic power-off function capable of automatically shutting off the power after lapse of a predetermined time while the imaging apparatus is left untouched and
wherein the switch moves between and among a power OFF position for curtailing the supply of power to the imaging apparatus, a mode selection position for selecting one of a plurality of different operation modes of the imaging apparatus and a power ON position for enabling the supply of power to the imaging apparatus disposed between the power OFF position and the mode selection position, the switch is stationary at the power OFF position and the power ON position and is resiliently biased towards the power ON position when the switch moves from the power ON position to the mode selection position such that, upon applying a sufficient force to the switch in the ON position and directed to the mode selection position, the switch moves from the ON position to the mode selection position and, upon removal of the sufficient force when the switch is at the mode selection position, the switch automatically returns to the ON position and moving the switch from the ON position, to the mode selection position and back again to the ON position toggles the imaging apparatus from a selected one of the plurality of different operation modes to a different selected one of the plurality of different operation modes.

6. The imaging apparatus as cited in claim 5, wherein said automatic power-off function enables the user to select ON/OFF of the automatic power-off function in accordance with the operation menu which is displayed on the screen of the display means, and moreover, when the automatic power-off is selected by the operation menu, the imaging apparatus is so controlled as to disable the power-off under a particular condition.

7. The imaging apparatus as cited in claim 6, wherein said particular condition includes a state where the imaging apparatus is connected with another electronic device by means of a cable or wireless.

8. The imaging apparatus as cited in claim 7, further comprising:
automatic extension means for automatically extending the time before the automatic power-off takes place if the user operates any key switch or the touch panel in addition to said particular condition.

9. The imaging apparatus as cited in claim 8, wherein said automatic extension means functions effectively by operation of any key other than touch keys which are effective for operating the touch panel.

10. An imaging apparatus comprising:
imaging means for imaging an object;
video recording means for recording a video signal imaged by said imaging means;
display means for displaying on the display screen the video data and having a function as the touch panel; and
mode switching means having a plurality of different operation modes and including a switch;
wherein said mode switching means includes operation mode notice means for displaying on the display screen of the display means characters indicating the changed operation mode and
wherein the switch moves between and among a power OFF position for curtailing power to the imaging apparatus, a mode selection position for selecting one of the plurality of different operation modes of the imaging apparatus and a power ON position for enabling power to the imaging apparatus disposed between the power OFF position and the mode selection position, the switch is stationary at the power OFF position and the power ON position and is resiliently biased towards the power ON position when the switch moves from the power ON position to the mode selection position such that, upon applying a sufficient force to the switch in the ON position and directed to the mode selection position, the switch moves from the ON position to the mode selection position and, upon removal of the sufficient force when the switch is at the mode selection position, the switch automatically returns to the ON position and moving the switch from the ON position, to the mode selection position and back again to the ON position toggles the imaging apparatus from a selected one of the plurality of different operation modes to a different selected one of the plurality of different operation modes.

11. The imaging apparatus as cited in claim 10, wherein said operation modes include a tape imaging mode for recording the data imaged by the imaging means on a tape and a memory imaging mode for writing the data imaged by the imaging means in a memory.

12. The imaging apparatus as cited in claim 10, wherein said operation mode notice means displays the characters on the screen of the display means only for a predetermined time after changing the operation mode.

13. The imaging apparatus as cited in claim 10, wherein said operation mode notice means displays characters on the screen of the display means and also provides an audible notice when the operation mode is changed.

14. The imaging apparatus as cited in claim 13, wherein said audible notice is a different sound depending on the changed operation mode.

15. An imaging apparatus comprising:
  imaging means for imaging an object;
  video recording means for recording a video signal imaged by said imaging means;
  display means for displaying on the screen the video data imaged by said imaging means and having a function as a touch panel; and
  mode switching means having a plurality of different operation modes and including a switch;
  wherein said mode switching means is provided with audible notice means which outputs a beep or a melody representing the changed operation mode and
  wherein the switch moves between and among a power OFF position for curtailing power to the imaging apparatus, a mode selection position for selecting one of the plurality of different operation modes of the imaging apparatus and a power ON position for enabling power to the imaging apparatus disposed between the power OFF position and the mode selection position, the switch is stationary at the power OFF position and the power ON position and is resiliently biased towards the power ON position when the switch moves from the power ON position to the mode selection position such that, upon applying a sufficient force to the switch in the ON position and directed to the mode selection position, the switch moves from the ON position to the mode selection position and, upon removal of the sufficient force when the switch is at the mode selection position, the switch automatically returns to the ON position and moving the switch from the ON position, to the mode selection position and back again to the ON position toggles the imaging apparatus from a selected one of the plurality of different operation modes to a different selected one of the plurality of different operation modes.

16. The imaging apparatus as cited in claim 15, wherein said operation modes include a tape imaging mode for recording the data imaged by said imaging means on a tape and a memory imaging mode for writing the data imaged by said imaging means in a memory.

17. The imaging apparatus as cited in claim 15, wherein said audible notice means outputs a beep or a melody for a predetermined time after changing the operation mode.

18. The imaging apparatus as cited in claim 15, wherein said audible notice means provides a different beep or melody depending on the changed operation mode.

* * * * *